US011125650B2

(12) United States Patent
Kim

(10) Patent No.: US 11,125,650 B2
(45) Date of Patent: Sep. 21, 2021

(54) COOLER FOR COOLING AN EXHAUST GAS DISCHARGED FROM AN ENGINE UNDERGOING TEST

(71) Applicant: KOREA AEROSPACE RESEARCH INSTITUTE, Daejeon (KR)

(72) Inventor: Chun Taek Kim, Daejeon (KR)

(73) Assignee: KOREA AEROSPACE RESEARCH INSTITUTE, Daejon (KR)

( * ) Notice: Subject to any disclaimer, the term of this patent is extended or adjusted under 35 U.S.C. 154(b) by 175 days.

(21) Appl. No.: 16/453,314

(22) Filed: Jun. 26, 2019

(65) Prior Publication Data

US 2020/0003657 A1    Jan. 2, 2020

(30) Foreign Application Priority Data

Jun. 27, 2018 (KR) .................. 10-2018-0074189

(51) Int. Cl.
*G01M 15/02*     (2006.01)
*G01M 15/14*     (2006.01)
*F01P 7/14*      (2006.01)

(52) U.S. Cl.
CPC .............. *G01M 15/14* (2013.01); *F01P 7/14* (2013.01); *G01M 15/02* (2013.01)

(58) Field of Classification Search
CPC ........... G01M 15/02; G01M 15/14; F01P 7/14
See application file for complete search history.

(56) References Cited

U.S. PATENT DOCUMENTS

| 5,396,793 A * | 3/1995 | Colletti ................... G01L 5/133 |
| | | 73/116.03 |
| 9,133,733 B2 * | 9/2015 | Zitouni .................... F01D 25/30 |
| 2004/0139785 A1 * | 7/2004 | Abdul-Khalek .... F02D 41/1467 |
| | | 73/28.01 |
| 2006/0021427 A1 * | 2/2006 | Fleming ................... G01M 9/04 |
| | | 73/147 |
| 2008/0034851 A1 * | 2/2008 | Anderson ............. B08B 15/002 |
| | | 73/116.02 |
| 2008/0250769 A1 * | 10/2008 | Wagner ..................... F02C 7/04 |
| | | 60/39.24 |
| 2011/0138772 A1 * | 6/2011 | Zitouni .................... F01D 25/30 |
| | | 60/226.1 |
| 2016/0169100 A1 * | 6/2016 | Hanawa .................. F02M 26/05 |
| | | 73/114.68 |
| 2018/0135514 A1 * | 5/2018 | Setty ......................... F02C 7/24 |
| 2020/0102856 A1 * | 4/2020 | McDeed ............... F01N 3/2066 |

FOREIGN PATENT DOCUMENTS

| KR | 20-1998-0037882 U | 9/1998 |
| KR | 10-2002-0016059 A | 3/2002 |
| KR | 10-2011-0073681 A | 6/2011 |

* cited by examiner

*Primary Examiner* — Eric S. McCall
(74) *Attorney, Agent, or Firm* — Burris Law, PLLC

(57) ABSTRACT

Provided is a cooler and an engine testing apparatus having the same. The cooler includes a guide unit configured to make a gas flow, a liquid supply unit arranged in the guide unit to supply a liquid into the guide unit, a liquid column guide unit connected to the guide unit and having a column of the liquid, and a liquid storage unit connected to the liquid column guide unit and storing the liquid.

6 Claims, 2 Drawing Sheets

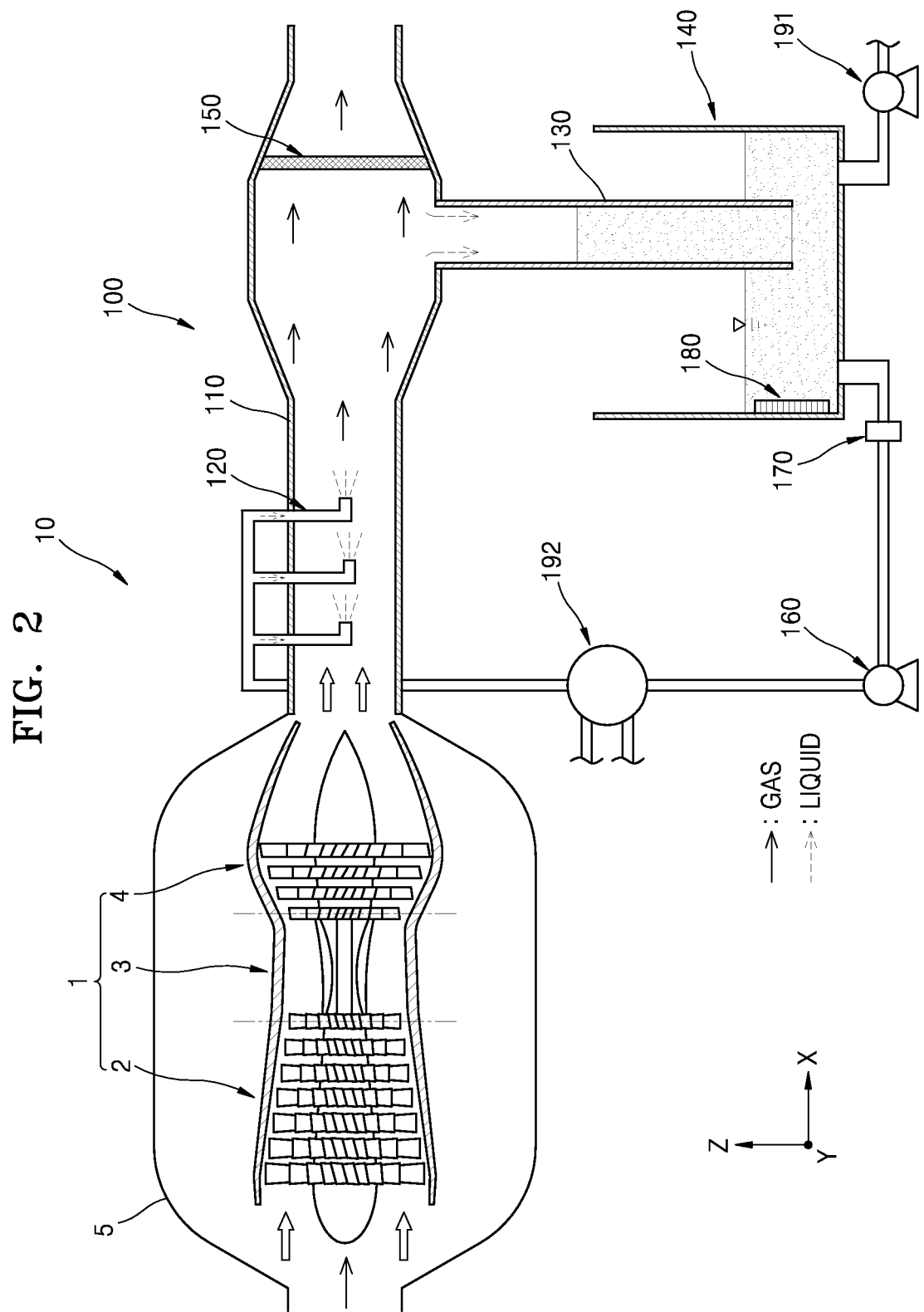

COOLER FOR COOLING AN EXHAUST GAS DISCHARGED FROM AN ENGINE UNDERGOING TEST

CROSS-REFERENCE TO RELATED APPLICATION

This application claims the benefit of Korean Patent Application No. 10-2018-0074189, filed on Jun. 27, 2018, in the Korean Intellectual Property Office, the disclosure of which is incorporated herein in its entirety by reference.

BACKGROUND

1. Technical Field

One or more embodiments relate to apparatuses, and more particularly, to a cooler and an engine testing apparatus having the same.

2. Description of the Related Art

In general, coolers may be used in various places and apparatuses. For example, a cooler in an engine testing apparatus may cool an exhaust gas discharged from an engine. The cooler may also cool gas, the air, or the like supplied by an external or separate apparatus.

This cooler may be in various shapes. For example, a cooler may cool gas or the like by supplying moisture to the gas or the like. According to another embodiment, a cooler may also cool gas or the like by performing heat exchange with gas or the like that passes through a heat exchanger. When a cooler cools gas or the like by directly supplying moisture to the gas or the like, a pump may be used to exhaust the moisture to the outside. However, in this case, when the cooler is used under a low-pressure environment, cavitation may occur in the pump. Moreover, when a cooler uses a heat exchanger, the heat exchanger directly contacts gas or the like and thus may be damaged, or soot or the like included in the gas or the like may be adsorbed onto the heat exchanger, leading to a degradation of the performance of the heat exchanger.

SUMMARY

One or more embodiments include a cooler and an engine testing apparatus having the same.

Additional aspects will be set forth in part in the description which follows and, in part, will be apparent from the description, or may be learned by practice of the presented embodiments.

According to one or more embodiments, a cooler includes a guide unit configured to make a gas flow, a liquid supply unit arranged in the guide unit to supply a liquid into the guide unit, a liquid column guide unit connected to the guide unit and having a column of the liquid, and a liquid storage unit connected to the liquid column guide unit and storing the liquid.

A plurality of liquid supply units may be included, and the plurality of liquid supply units may be spaced apart from each other in a flow direction of the gas.

A cross-sectional area of the guide unit that is perpendicular to a flow direction of the gas may vary from upstream to downstream in the flow direction of the gas.

The cooler may further include a screen arranged in the guide unit and located closer to the downstream than the liquid supply unit in the flow direction of the gas.

An internal pressure of the guide unit may be lower than an atmospheric pressure.

The cooler may further include a liquid circulation unit arranged on a channel that connects the liquid storage unit to the liquid supply unit and configured to supply a liquid stored in the liquid storage unit to the liquid spray unit.

According to one or more embodiments, an engine testing apparatus includes an engine test body, a guide unit through which an exhaust gas sprayed by the engine test body passes, a liquid supply unit arranged in the guide unit to supply a liquid into the guide unit, a liquid column guide unit connected to the guide unit and having a column of the liquid, and a liquid storage unit connected to the liquid column guide unit and storing the liquid.

A cross-sectional area of the guide unit that is perpendicular to a flow direction of the gas may vary from upstream to downstream in the flow direction of the exhaust gas.

The cooler may further include a screen arranged in the guide unit and located closer to the downstream than the liquid supply unit in the flow direction of the exhaust gas.

An internal pressure of the guide unit may be lower than an atmospheric pressure.

The cooler may further include a liquid circulation unit arranged on a channel that connects the liquid storage unit to the liquid supply unit and configured to supply a liquid stored in the liquid storage unit to the liquid spray unit.

DESCRIPTION OF THE DRAWINGS

These and/or other aspects will become apparent and more readily appreciated from the following description of the embodiments, taken in conjunction with the accompanying drawings in which:

FIG. 2 is a conceptual view of an engine testing apparatus including a cooler according to another embodiment of the present invention.

DETAILED DESCRIPTION OF THE EMBODIMENTS

Figure 1:
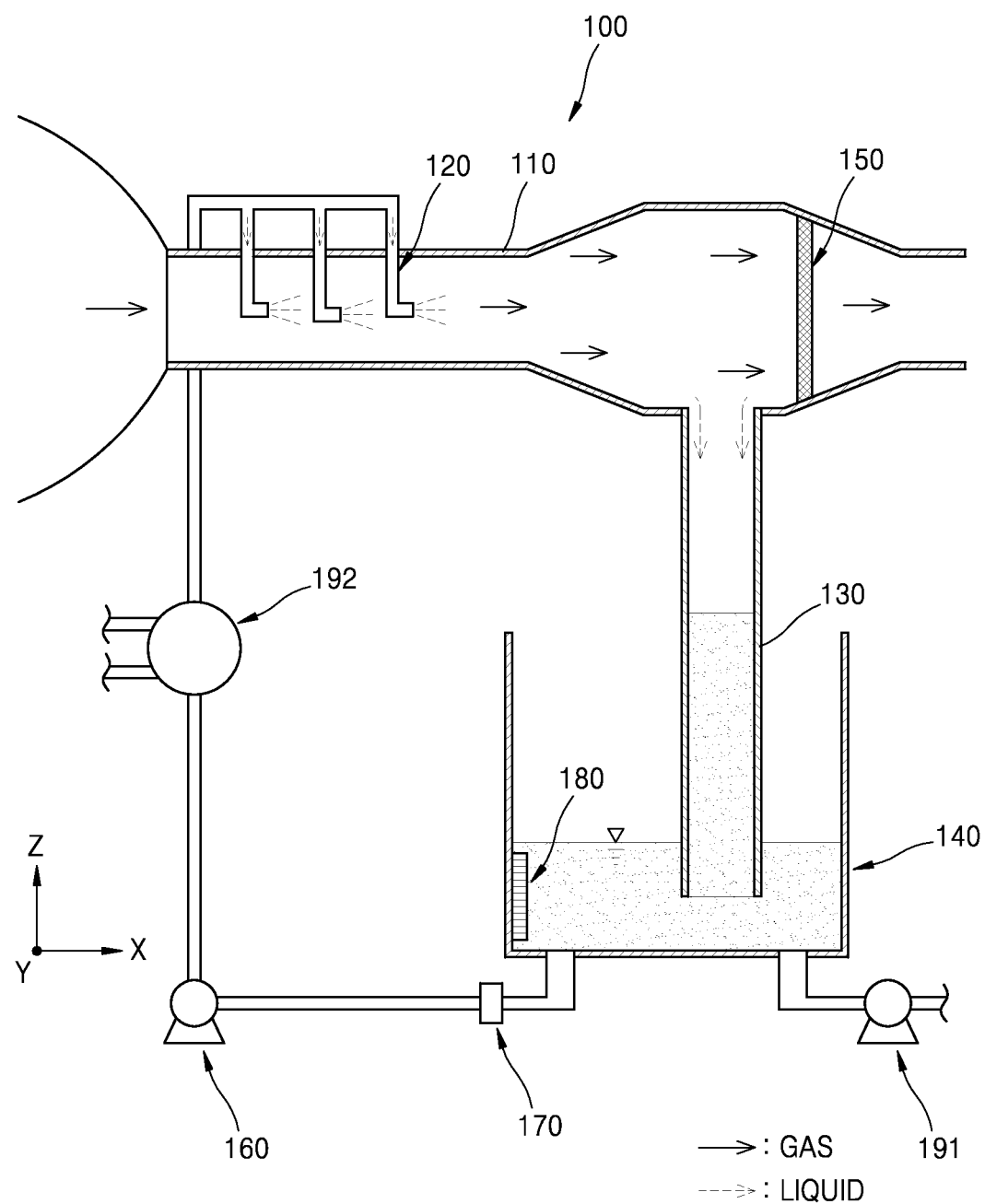
FIG. 1 is a conceptual view of a cooler according to an embodiment of the present invention.

The present invention will now be described more fully with reference to the accompanying drawings, in which exemplary embodiments of the invention are shown. The present invention may, however, be embodied in many different forms and should not be construed as being limited to the embodiments set forth herein; rather, these embodiments are provided so that this disclosure will be thorough and complete, and will fully convey the concept of the invention to those skilled in the art. The scope of the present invention is only defined by the appended claims. The terminology used herein is for the purpose of describing particular embodiments only and is not intended to limit the invention. As used herein, the singular forms "a", "an" and "the" are intended to include the plural forms as well, unless the context clearly indicates otherwise. It will be understood that the terms "comprises" and/or "comprising," when used in this specification, specify the presence of stated components, steps, operations, and/or elements thereof, but do not preclude the presence or addition of one or more other components, steps, operations, and/or elements thereof. While such terms as "first", "second", etc., may be used to describe various components, such components must not be limited to the above terms. The above terms are used only to distinguish one component from another.

FIG. 1 is a conceptual view of a cooler 100 according to an embodiment of the present invention.

Referring to FIG. 1, the cooler 100 may include a guide unit 110, a liquid supply unit 120, a liquid column guide unit 130, a liquid storage unit 140, a screen 150, a liquid circulation unit 160, a filter unit 170, an external liquid supply unit 191, and a cooling unit 192.

The guide unit 110 may form a channel through which gas passes. The guide unit 110 may be implemented in various shapes. For example, the guide unit 110 may be in the shape of a pipe that is connected to the outside or an external apparatus. According to another embodiment, the guide unit 110 may include a channel such as a building which is connected to the outside or an external apparatus and through which gas supplied by the outside or the external apparatus passes. In this case, the external apparatus may be any of various apparatuses. Examples of the external apparatus may include an engine test body and semiconductor equipment.

A cross-sectional area of the guide unit 110 that is perpendicular to a flow direction of gas may be changed starting from one point. For example, the cross-sectional area of the guide unit 110 may be changed starting from downstream behind the liquid supply unit 120 in the flow direction of gas. In this case, the cross-sectional area of the guide unit 110 may vary from upstream to downstream in the flow direction of gas. For example, the cross-sectional area of the guide unit 110 may be constant from an entrance of the guide unit 110 to one point. In other words, the cross-sectional area of the guide unit 110 may be constant from the entrance of the guide unit 110 to one point and then may increase from the one point to another point of the guide unit 110. The cross-sectional area of the guide unit 110 may decrease from the other point to downstream in the flow direction of gas and then may become constant. In this case, a space through which gas passes is expanded in a portion of the guide unit 110, where the cross-sectional area increases, and thus, a liquid supplied by the liquid supply unit 120 may be easily collected.

The liquid supply unit 120 may supply a liquid to the guide unit 110. The liquid may be a material that is supplied to the guide unit 110 and cools gas that passes through the guide unit 110. For example, the liquid may be water.

The liquid supply unit 120 may spray the liquid into the guide unit 110. In this case, the liquid supply unit 120 may include a nozzle that sprays the liquid. In particular, the liquid supply unit 120 may supply the liquid as mist such that the liquid contacts the gas within the guide unit 110.

The liquid column guide unit 130 may be connected to the guide unit 110. The liquid column guide unit 130 may store a liquid. The liquid column guide unit 130 may provide a path along which the liquid collected within the guide unit 110 or a liquid having dropped on a lower surface of the guide unit 110 moves. The liquid column guide unit 130 may be connected to the liquid storage unit 140 and the inside of the guide unit 110. A height of a liquid column stored in the liquid column guide unit 130 may be based on a difference between the pressure of the surface of the liquid storage unit 140 and the pressure of the inside of the guide unit 110.

The liquid storage unit 140 may be connected to the liquid column guide unit 130 and may accommodate the liquid inside the liquid column guide unit 130 or supply the liquid to the liquid column guide unit 130. In this case, the liquid storage unit 140 may be partially exposed to the outside. In this case, the liquid storage unit 140 may be arranged in a different space from the guide unit 110 and may be exposed to the air.

The screen 150 may be arranged in the guide unit 110 and may collect the liquid within the guide unit 110. The screen 150 may be formed in a lattice shape. For example, the screen 150 may be formed in a mesh shape. The screen 150 may be arranged close to an exit of the guide unit 110. For example, the screen 150 may be arranged closer to a downstream side than the liquid supply unit 120 in the flow direction of gas. In this case, the screen 150 may collect the liquid that cooled the gas.

The liquid circulation unit 160 may supply the liquid stored in the liquid storage unit 140 to the liquid supply unit 120. In this case, the liquid circulation unit 160 may be arranged on a channel along which the liquid moves from the liquid storage unit 140 to the liquid supply unit 120. In this case, the liquid circulation unit 160 may include a device capable of circulating the liquid, such as a pump.

The filter unit 170 may be arranged on the channel along which the liquid moves from the liquid storage unit 140 to the liquid supply unit 120. In this case, the filter unit 170 may be arranged on the channel to be detachable from the channel. The filter unit 170 may separate a foreign material or the like from the liquid. The filter unit 170 may be formed in a mesh shape. The filter unit 170 may be arranged between the liquid circulation unit 160 and the liquid storage unit 140.

The external liquid supply unit 191 may be connected to the liquid storage unit 140 and supply a liquid to the liquid storage unit 140. The external liquid supply unit 191 may operate according to a result of sensing performed by a liquid level sensing unit 180. The external liquid supply unit 191 may include a pump and a pipe through which a liquid moves.

The cooling unit 192 may cool the liquid moving from the liquid storage unit 140 to the liquid supply unit 120. The cooling unit 192 may be formed in various shapes. For example, the cooling unit 192 may include a cooling tower. According to another embodiment, the cooling unit 192 may include a heat exchanger. According to another embodiment, the cooling unit 192 may include a cooling cycle. For convenience of explanation, a case where the cooling unit 192 includes a cooling tower will now be focused on and described in detail.

Regarding an operation of the cooler 100, when a high-temperature gas is supplied by the outside or the external apparatus, the high-temperature gas may flow into the entrance of the guide unit 110 and move to the exit of the guide unit 110 along the guide unit 110. At this time, various gases may move within the cooler 100. For example, one of these various gases may be a refrigerant that is used in the cooling cycle. In this case, a compressor may be connected to a rear end of the cooler 100. According to another embodiment, one of these various gases may be a combustion gas that is generated in a gas turbine. The various gases are not limited thereto, and may be high-temperature gases that are used in various industrial fields.

While the gas is moving along the guide unit 110 as described above, the liquid supply unit 120 may spray a fluid into the guide unit 110. The sprayed fluid may lower the temperature of the gas while moving along the flow of the gas. The sprayed fluid may be condensed or move to the lower surface of the guide unit 110 due to its weight. The sprayed fluid may move along the guide unit 110. In this case, when the sprayed fluid reaches a section where the internal space of the guide unit 110 expands, the temperature of the gas may decrease and thus the sprayed fluid may be collected.

When the gas moves along the guide unit 110 as described above, an internal pressure of the guide unit 110 may be lower than the atmospheric pressure.

In the above case, the height of the liquid column within the liquid column guide unit 130 may vary according to the internal pressure of the guide unit 110. In this case, the height of the liquid column stored in the liquid column guide unit 130 may correspond to a difference between the internal pressure of the guide unit 110 and the atmospheric pressure.

After the liquid sprayed into the guide unit 110 cools the temperature of the gas, the sprayed liquid may move to the liquid column guide unit 130 via the guide unit 110. At this time, because the height of the liquid column within the liquid column guide unit 130 is determined to correspond to the difference between the internal pressure of the guide unit 110 and the atmospheric pressure, when a liquid flows into the liquid column guide unit 130, the liquid moves from the liquid column guide unit 130 to the liquid storage unit 140, and thus, the height of the liquid column on the liquid column guide unit 130 may be maintained constant. In other words, due to a liquid newly flowed into the liquid column guide unit 130, the liquid within the liquid column guide unit 130 may move to the liquid storage unit 140.

This operation may be continuously performed when gas is supplied to the guide unit 110. In this case, one or more liquid column guide units 130 may be included, and the one or more liquid column guide units 130 may be connected to the guide unit 110 and the liquid storage unit 140.

While this process is being conducted, the screen 150 may collect the fluid moving along the guide unit 110. The fluid collected by the screen 150 may move to the lower surface of the guide unit 110 and then move to the liquid column guide unit 130 via the guide unit 110.

While this process is being conducted, the liquid circulation unit 160 may move the liquid stored in the liquid storage unit 140 to the liquid supply unit 120. As described above, the liquid storage unit 140 may include the liquid level sensing unit 180. In this case, when the level of the liquid stored in the liquid storage unit 140 is determined based on the result of the sensing to be less than or equal to a preset liquid level, the external liquid supply unit 191 may supply a liquid from an external source to the liquid storage unit 140.

When the liquid circulation unit 160 operates as described above, the filter unit 170 may remove a foreign material from the liquid. In other words, when the gas passing through the guide unit 110 is a combustion gas discharged from a device, such as an internal combustion engine, the gas may be mixed with a foreign material such as soot and may be flowed into the liquid storage unit 140, together with the fluid. At this time, when the liquid circulation unit 160 operates to make a liquid flow, the foreign material stored in the liquid storage unit 140 may move together with the liquid to the liquid circulation unit 160. In this case, the liquid circulation unit 160 may be damaged or broken down. However, the filter unit 170 may remove the foreign material from the liquid and thus prevent the foreign material from flowing into the liquid circulation unit 160.

When the liquid circulation unit 160 operates to supply the liquid from the liquid storage unit 140 to the liquid supply unit 120 as described above, the cooling unit 192 may lower the temperature of the liquid. In this case, the liquid supplied to the liquid supply unit 120 by the liquid circulation unit 160 may maintain a lower temperature than the temperature of the liquid.

Accordingly, the cooler 100 is able to cool the gas passing through the guide unit 110 according to a simple structure, and is also able to easily and quickly collect that is used to cool the gas.

The cooler 100 may prevent a pump or the like from being damaged when the liquid in the guide unit 110 is collected, by collecting the liquid without using a special pump. The cooler 100 is also able to effectively remove the liquid in the guide unit 110 even when the guide unit 110 has a lower pressure than the atmospheric pressure.

FIG. 2 is a conceptual view of an engine testing apparatus 10 including a cooler 100 according to another embodiment of the present invention.

Referring to FIG. 2, the engine testing apparatus 10 may include an engine test body 1, a housing 5, and the cooler 100. The engine test body 1 may include a jet engine. In this case, the engine test body 1 may be arranged inside an experiment room or outside a building and may be connected to the cooler 100.

The engine test body 1 may include a compressor 2 for compressing the air flowing into the engine test body 1, a combuster 3 for mixing the compressed air with fuel, burning a mixture, and generating a combustion gas, and a turbine 4 for generating power by using the combustion gas generated by the combuster 3. The compressor 2, the combuster 3, and the turbine 4 may be integrally formed with each other, and a rotating shaft of the compressor 2 may be connected to that of the turbine 4.

The housing 5 has a space formed therein, and the engine test body 1 may be arranged in the housing 5. In this case, the housing 5 may guide an external gas supplied to the engine test body 1 to the engine test body 1. The housing 5 may supply the external gas to the cooler 100 by being connected to the cooler 100, and the gas may be mixed with the combustion gas sprayed by the engine test body to thereby lower the temperature of the combustion gas.

The cooler 100 may include a guide unit 110, a liquid supply unit 120, a liquid column guide unit 130, a liquid storage unit 140, a screen 150, a liquid circulation unit 160, and a filter unit 170. Since the guide unit 110, the liquid supply unit 120, the liquid column guide unit 130, the liquid storage unit 140, the screen 150, the liquid circulation unit 160, and the filter unit 170 are the same as or similar to those described above with reference to FIG. 1, a repeated description thereof will be omitted. A plurality of liquid column guide units 130 may be included.

A special exhaust compressor (not shown) may be connected to a rear end of the cooler 100. The exhaust compressor may be connected to an exit of the guide unit 110 and thus discharge the gas in the guide unit 110 to the outside and also maintain an internal pressure of the guide unit 110 and an internal pressure of the housing 5 to be lower than the atmospheric pressure. In particular, the exhaust compressor may move the gas in the housing 5 to the guide unit 110 to thereby implement an environment such as the engine test body 1 being used at a high altitude. In other words, when the exhaust compressor operates, the gas in the housing 5 may move via the guide unit 110, and thus, the internal pressure of the housing 5 may be lowered.

Regarding an operation of the engine testing apparatus 10, after the engine test body 1 is driven, the state of the engine test body 1 may be measured according to a behavior of the engine test body 1 via various sensors or the like. When the engine test body 1 operates, the combustion gas having passed through the turbine 4 may enter the guide unit 110. In this case, the guide unit 110 may have a pipe shape, or may be a portion of a building formed with cement or the like. The guide unit 110 may have a structure of completely blocking ambient air and the combustion gas.

Because the combustion gas moving along the guide unit 110 has a high temperature, the liquid supply unit 120 may spray a liquid to the guide unit 110 to lower the temperature of the combustion gas. After the sprayed liquid cools the combustion gas in the guide unit 110, the sprayed liquid may move to the liquid column guide unit 130. At this time, because a height of a liquid column within the liquid column guide unit 130 is determined according to a difference between the internal pressure of the guide unit 110 and an external pressure of the liquid storage unit 140, even when a liquid continuously flows into the liquid column guide unit 130, the height of the liquid column within the liquid column guide unit 130 may be kept constant. In this case, due to a liquid flowed into the liquid column guide unit 130, the liquid previously stored in the liquid column guide unit 130 may be supplied to the liquid storage unit 140.

In the above case, speeds of the gas and the combustion gas moving along the guide unit 110 may decrease due to an increase in the internal area of the guide unit 110. At this time, the liquid may be collected and drop to a lower surface of the guide unit 110, and thus may enter the liquid column guide unit 130. The liquid moving along the guide unit 110 may collide with the screen 150 and may be collected, and thus, move to the liquid column guide unit 130. In this case, the guide unit 110 may be formed to have an internal shape in which an entrance of the liquid column guide unit 130 is lowest.

The liquid moving to the liquid storage unit 140 along the liquid column guide unit 130 as described above may move to the liquid supply unit 120 according to an operation of the liquid circulation unit 160. At this time, the liquid entering the guide unit 110 may include the soot included in the combustion gas, and the soot may be filter out by the filter unit 170 according to the operation of the liquid circulation unit 160.

The filter unit 170 may include a sensor (not shown) that informs a replacement time point of the filter unit 170 by measuring the degree of the soot adsorbed onto the filter unit 170. For example, the sensor may measure the degree of the soot adsorbed onto the filter unit 170, by sensing resistance of the filter unit 170.

Accordingly, the engine testing apparatus 10 is able to test the performance of the engine test body 1 when the engine test body 1 is under various environments. The engine testing apparatus 10 may reuse a liquid necessary for cooling when testing is performed. The engine testing apparatus 10 may prevent a pump or the like from being broken down when the pump or the like circulates a liquid. The engine testing apparatus 10 is able to cool the combustion gas and then continuously collect a liquid via a simple structure.

According to embodiments of the present invention, a gas may be efficiently and quickly cooled. In addition, embodiments of the present invention are applicable even under a lower pressure than the atmospheric pressure.

According to embodiments of the present invention, a gas may be cooled via a simple structure.

While one or more embodiments have been described with reference to the figures, it will be understood by those of ordinary skill in the art that various changes in form and details may be made therein without departing from the spirit and scope of the disclosure as defined by the following claims.

The invention claimed is:

1. A cooler for cooling an exhaust gas discharged from an engine undergoing test, comprising:
    a guide unit configured to guide a gas flow discharged from an engine undergoing test;
    a liquid supply unit arranged in the guide unit to supply a liquid inside of the guide unit;
    a liquid column guide unit connected to the guide unit and structured to form a column that stores the liquid collected within the guide unit, the liquid column guide unit providing a path along which the liquid collected within the guide unit or the liquid dropped on a lower surface of the guide unit moves; and
    a liquid storage unit connected to the liquid column guide unit and storing the liquid inside the liquid column guide unit or supplying the liquid to the liquid column guide unit;
    wherein a height of the liquid stored in the column of the liquid column guide unit corresponds to a difference between a pressure at the surface of the liquid storage unit and an internal pressure of the guide unit.

2. The cooler of claim 1, wherein the liquid supply unit further comprises one or more liquid supply units, and said one or more liquid supply units are spaced apart from each other in a flow direction of the gas.

3. The cooler of claim 1, wherein a cross-sectional area of the guide unit, viewed perpendicular to a flow direction of the gas, varies from upstream to downstream of the flow direction of the gas.

4. The cooler of claim 1, further comprising a screen arranged in the guide unit-close to an exit of the guide unit and toward a downstream location of the flow direction of the gas such that the screen collects the liquid within the guide unit.

5. The cooler of claim 1, wherein the internal pressure of the guide unit is lower than an atmospheric pressure.

6. The cooler of claim 1, further comprising a liquid circulation unit arranged on a channel that connects the liquid storage unit to the liquid supply unit and configured to supply a liquid stored in the liquid storage unit to the liquid spray unit.

* * * * *